United States Patent
Chang (10) Patent No.: US 7,819,409 B2
(45) Date of Patent: Oct. 26, 2010

(54) FOLDABLE WHEEL SEAT

(76) Inventor: Chin-Lin Chang, No. 636, Yuan-Huan E. Rd., Feng-Yuan City, Taichung Hsien (TW)

( * ) Notice: Subject to any disclaimer, the term of this patent is extended or adjusted under 35 U.S.C. 154(b) by 139 days.

(21) Appl. No.: 12/314,396

(22) Filed: Dec. 10, 2008

(65) Prior Publication Data

US 2010/0140889 A1    Jun. 10, 2010

(51) Int. Cl.
*B62B 3/00*    (2006.01)
(52) U.S. Cl. .............................. 280/47.371; 280/47.17; 280/47.24; 280/47.26; 280/47.31; 280/646; 280/654
(58) Field of Classification Search .................. 280/37, 280/38, 646, 654, 655, 43, 47.17, 47.2, 47.24, 280/47.26, 47.31, 47.371
See application file for complete search history.

(56) References Cited

U.S. PATENT DOCUMENTS

| 2,587,688 | A | * | 3/1952 | Bosk | 280/39 |
| 5,403,022 | A | * | 4/1995 | Snider | 280/30 |
| 6,607,207 | B2 | * | 8/2003 | Shapiro et al. | 280/287 |
| 6,729,647 | B2 | * | 5/2004 | Shapiro et al. | 280/775 |
| 6,733,026 | B1 | * | 5/2004 | Robberson et al. | 280/415.1 |
| 6,845,991 | B1 | * | 1/2005 | Ritucci et al. | 280/30 |
| 7,118,115 | B2 | * | 10/2006 | Abel | 280/43.13 |
| 7,201,385 | B2 | * | 4/2007 | Renz et al. | 280/79.11 |
| 7,264,265 | B2 | * | 9/2007 | Shapiro | 280/643 |
| 7,334,802 | B2 | * | 2/2008 | Kaplan | 280/47.26 |
| 7,703,795 | B2 | * | 4/2010 | Williamson | 280/656 |

* cited by examiner

*Primary Examiner*—Toan C To
(74) *Attorney, Agent, or Firm*—Bacon & Thomas, PLLC (57) ABSTRACT

A foldable wheel seat has a base, an operating bar, a first rotating shaft and two wheel axles. The base has a groove formed in a top face of the base. The operating bar is mounted pivotally in the groove of the base. The first rotating shaft is mounted rotatably in the base and has at least one end and two pulling segments. The at least one end of the first rotating shaft is extended into the groove of the base and is securely connected to the operating bar. The pulling segments are mounted on the first rotating shaft and each pulling segment has two pulling tabs. The wheel axles are mounted rotatably in the base and are perpendicular to the first rotating shaft and below the pulling segments of the first rotating shaft. Each wheel axle has an engaging block, at least two wheels, a holding panel and a torsional spring.

10 Claims, 8 Drawing Sheets

FOLDABLE WHEEL SEAT

BACKGROUND OF THE INVENTION

1. Field of the Invention

The present invention relates to a wheel seat, and more particularly to a foldable wheel seat that can be used conveniently.

2. Description of Related Art

A conventional foldable wheel seat is mounted securely on a bottom of a storage container, a trolley or a golf bag and has a base and multiple wheels mounted on the base, therefore users can move the heavy storage container, the trolley or the golf bag easily.

However, when the users want to fold the wheels of the conventional foldable wheel seat relative to the base, they have to turn the bottom of the storage container, the trolley or the golf bag over firstly and this is inconvenient in use.

To overcome the shortcomings, the present invention provides a foldable wheel seat to mitigate or obviate the aforementioned problems.

SUMMARY OF THE INVENTION

The main objective of the present invention is to provide a foldable wheel seat that can be used conveniently.

The foldable wheel seat in accordance with the present invention has a base, an operating bar, a first rotating shaft and two wheel axles. The base has a top face, a chamber and a groove. The groove is formed in the top face of the base. The operating bar is mounted pivotally in the groove of the base. The first rotating shaft is mounted rotatably in the chamber of the base near a rear end and has at least one end and two pulling segments. The at least one end of the first rotating shaft is extended into the groove of the base and is securely connected to the operating bar. The pulling segments are mounted on the first rotating shaft and each pulling segment has two pulling tabs. The wheel axles are mounted rotatably in the base and are perpendicular to the first rotating shaft and below the pulling tabs of the pulling segments of the first rotating shaft. Each wheel axle has an engaging block, at least two wheels, a holding panel and a torsional spring.

Other objectives, advantages and novel features of the invention will become more apparent from the following detailed description when taken in conjunction with the accompanying drawings.

DETAILED DESCRIPTION OF THE PREFERRED EMBODIMENT

With reference to FIGS. 1 to 3, 7 and 8, a foldable wheel seat in accordance with the present invention can be mounted securely on a bottom of a storage container or a golf bag and has a base (10, 10A, 10B), an operating bar (20, 20A, 20B), a first rotating shaft (30, 30A, 30B), a second rotating shaft (40), a linking beam (50), two wheel axles (60) and a drive pedal (70).

The base (10, 10A, 10B) may be rectangular and has a top face, a bottom face, a middle, a front end, a rear end, two side edges, a chamber, an opening, a groove (11, 11A, 11B), an elongated through hole, two guide frames (12) and multiple mounting frames (13). The chamber is defined in the base (10, 10A, 10B) between the faces of the base (10, 10A, 10B). The opening is formed through the bottom face of the base (10, 10A, 10B) and communicates with the chamber. The groove (11, 11A, 11B) may be U-shaped or elongated shaped, is formed in the top face of the base (10, 10A, 10B) and may be formed along the front end and the side edges or along one of the side edges of the base (10, 10A, 10B) and has at least one end adjacent to the rear end of the base (10, 10A, 10B). The elongated through hole is formed through the rear end of the base (10, 10A, 10B) near the middle. The guide frames (12) may be L-shaped and are mounted on the bottom of the base (10, 10A, 10B) near the elongated through hole and face to each other. The mounting frames (13) may be L-shaped and are mounted on the bottom of the base (10, 10A, 10B) in pairs.

The operating bar (20, 20A, 20B) may be U-shaped or elongated shaped and is mounted pivotally in the groove (11, 11A, 11B) of the base (10, 10A, 10B).

The first rotating shaft (30, 30A, 30B) is mounted rotatably in the chamber of the base (10, 10A, 10B) between two mounting frames (13) near the rear end of the base (10, 10A, 10B) and has two ends, a middle, two pulling segments (31), a connecting beam (32) and two positioning elements (33). At least one end of the first rotating shaft (30, 30A, 30B) is extended into the groove (11, 11A, 11B) of the base (10, 10A, 10B) near the rear end and is securely connected to the operating bar (20, 20A, 20B) by fasteners.

Figure 1:
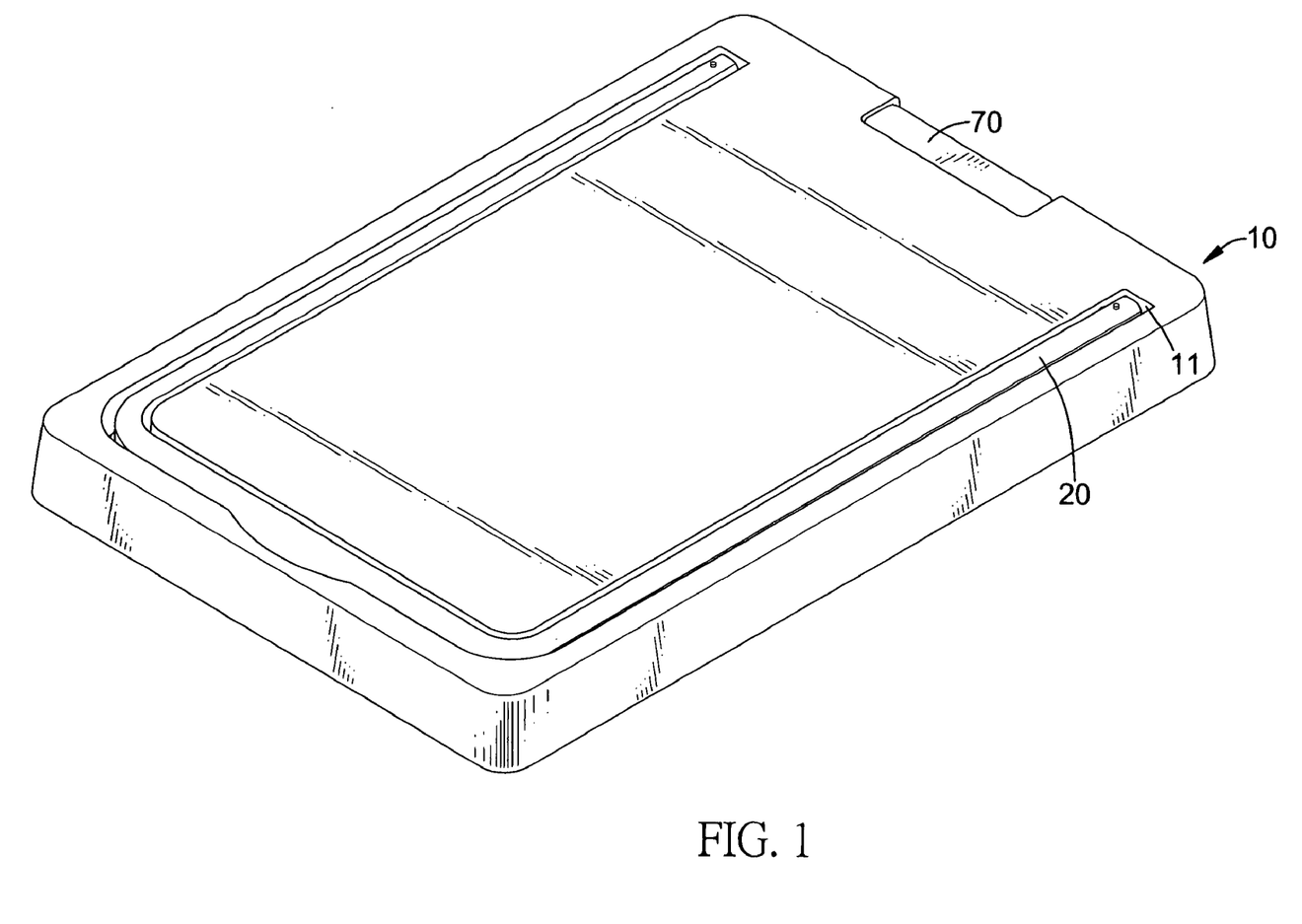
FIG. 1 is a perspective view of a first embodiment of a foldable wheel seat in accordance with the present invention.
Figure 2:
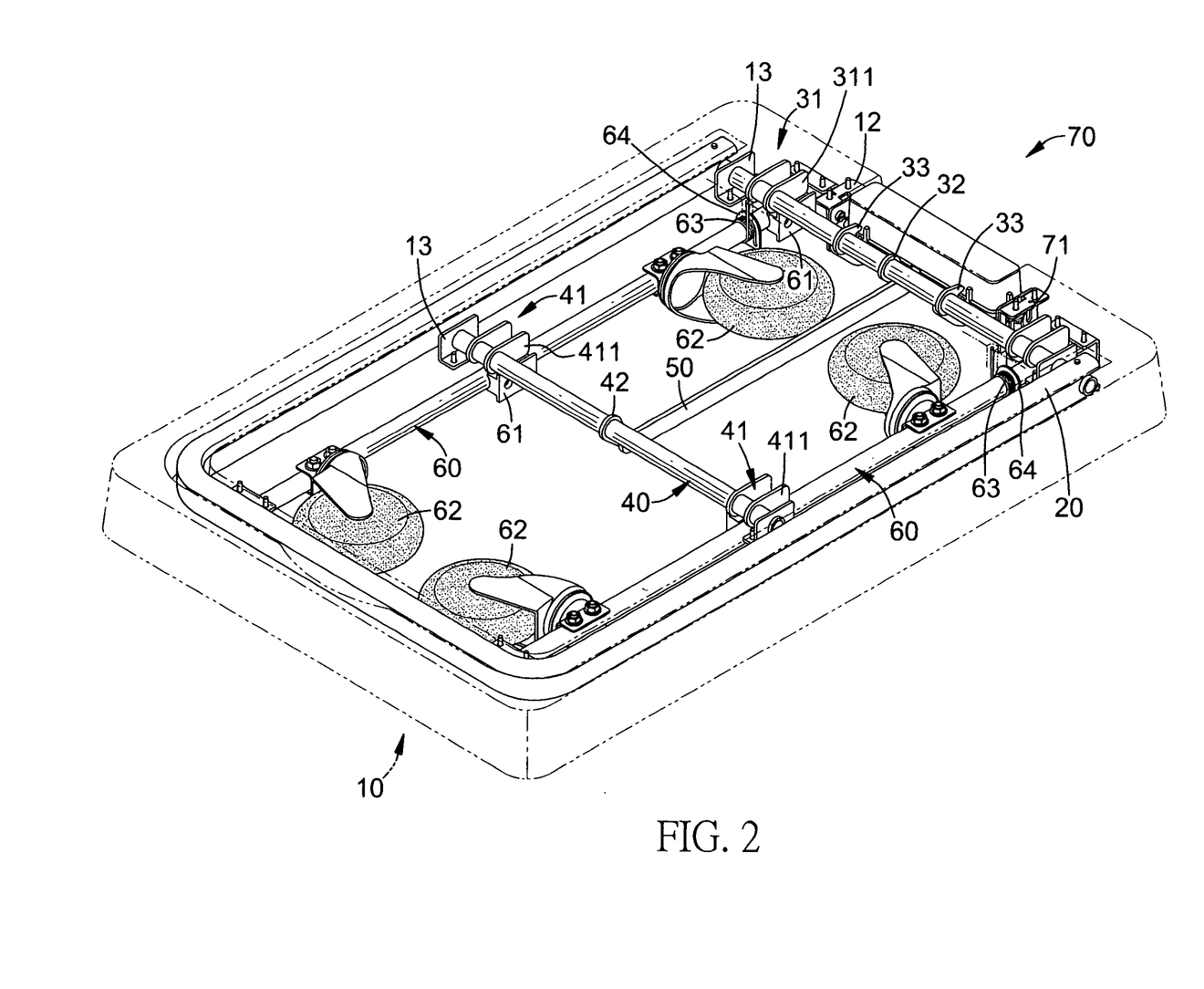
FIG. 2 is another perspective view of the foldable wheel seat in FIG. 1.
Figure 3:
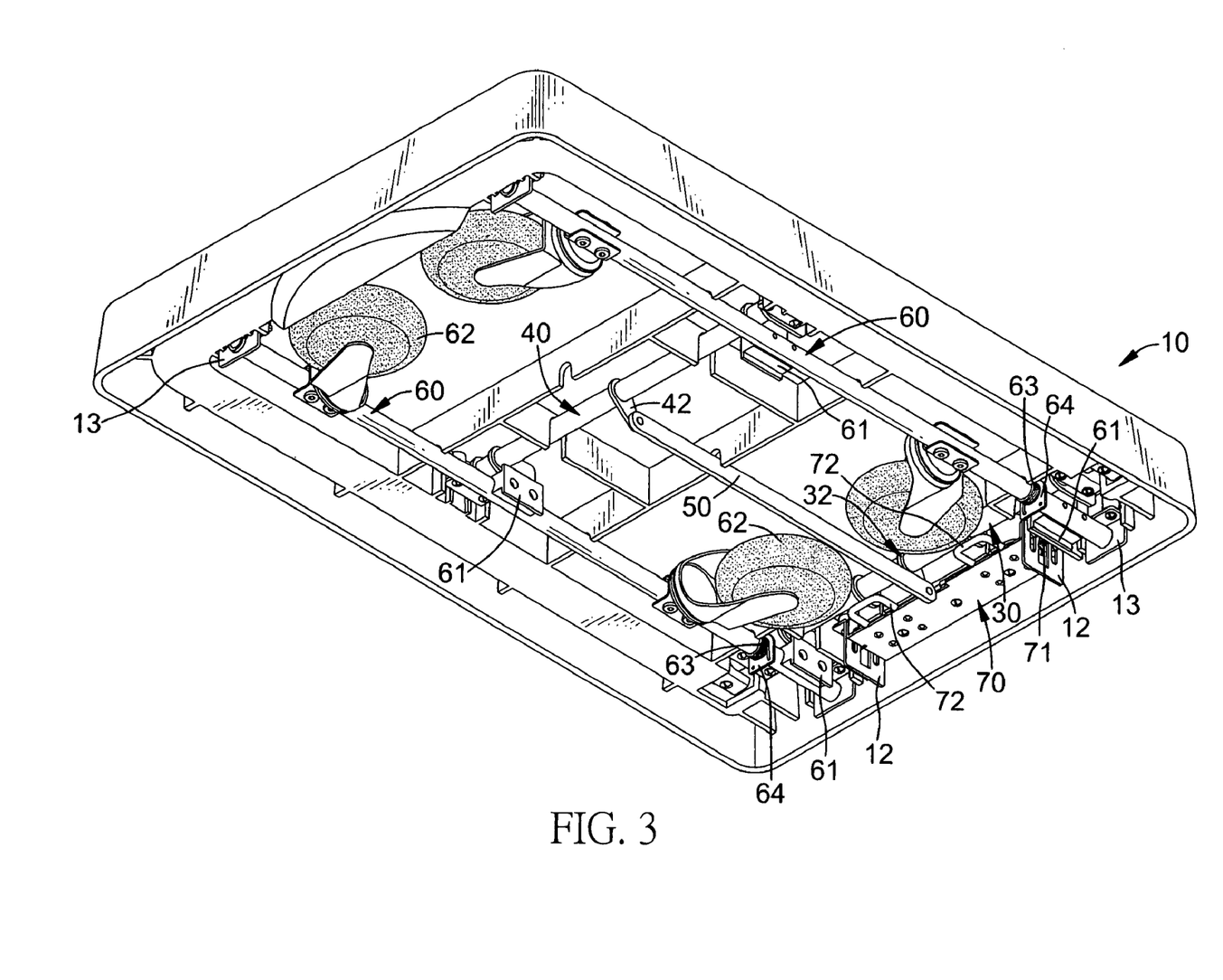
FIG. 3 is a bottom perspective view of the foldable wheel seat in FIG. 1.
Figure 4:
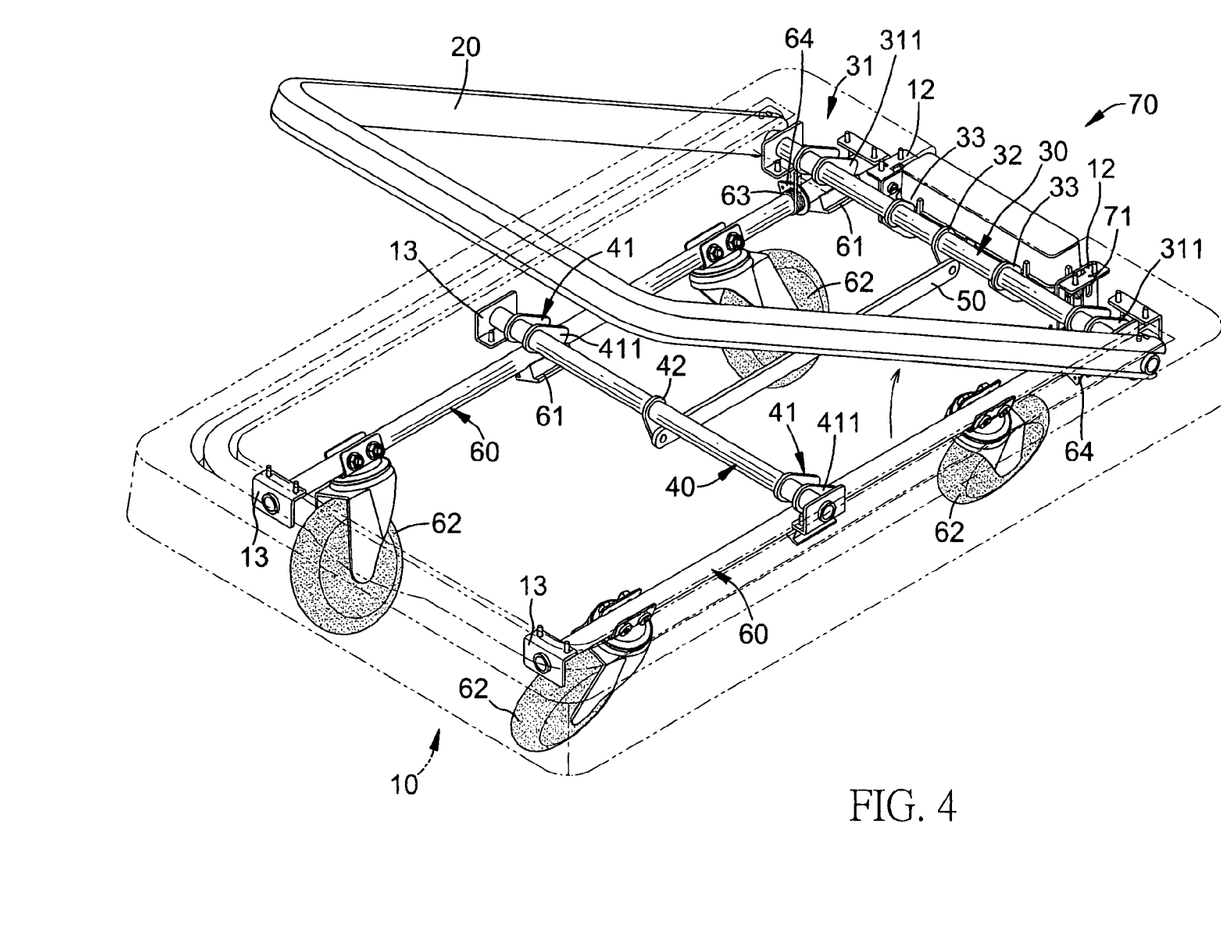
FIGS. 4 to 6 are operational perspective views of the foldable wheel seat in FIG. 1.
Figure 5:
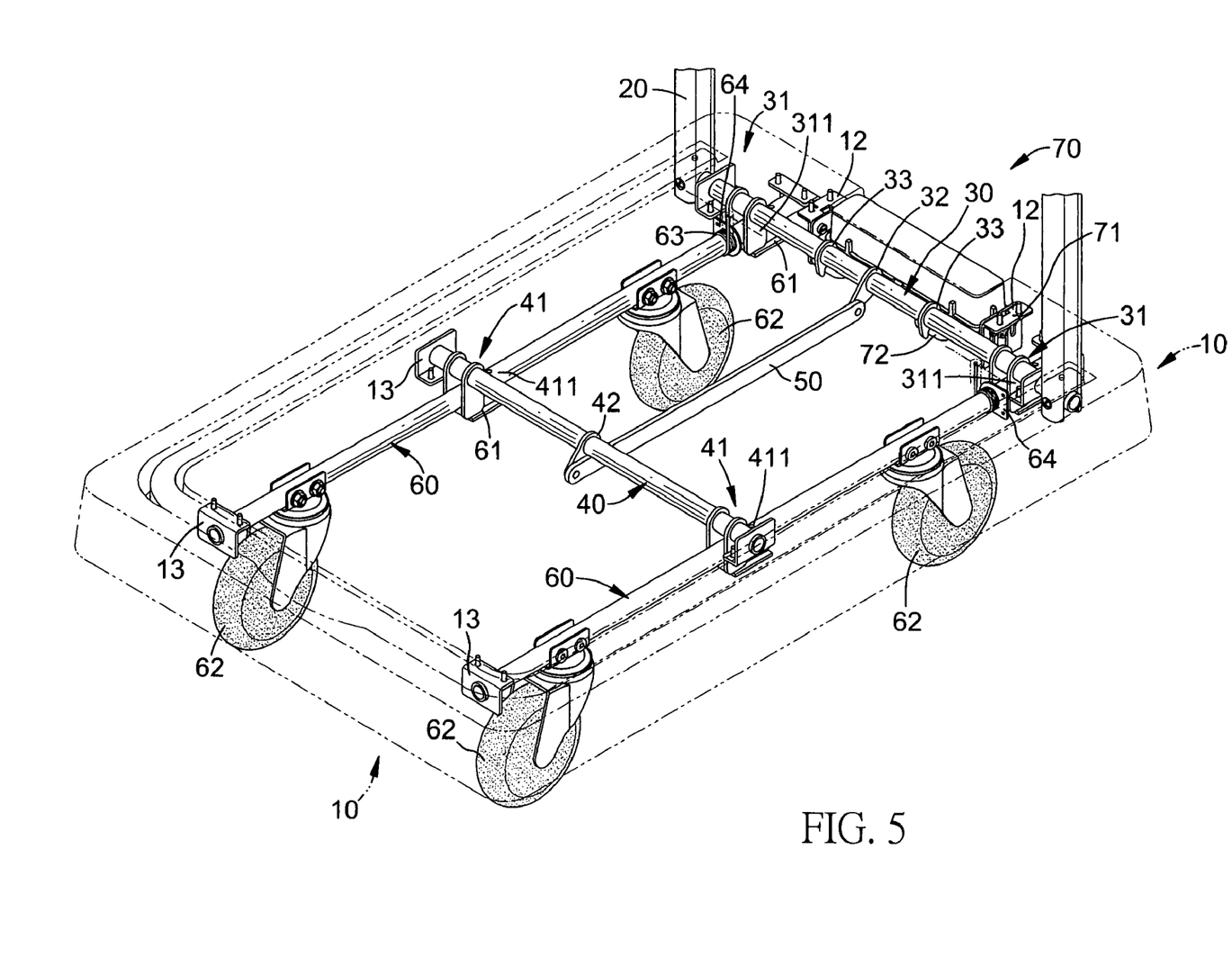

The pulling segments (31) are mounted on the first rotating shaft (30, 30A, 30B) near the ends and each pulling segment (31) has two pulling tabs (311). The pulling tabs (311) are mounted on the first rotating shaft (30, 30A, 30B), are parallel with each other and are protruded to the rear end of the base (10, 10A, 10B), and each pulling tab (311) has a contacting side.

The connecting beam (32) is mounted on the middle of the first rotating shaft (30, 30A, 30B) between the pulling segments (31) and has a connecting end.

The positioning elements (33) are mounted on the first rotating shaft (30, 30A, 30B) between the pulling segments (31) and the connecting beam (32) and each positioning element (33) has an engaging gap.

The second rotating shaft (40) is mounted rotatably in the chamber of the base (10, 10A, 10B) between two mounting frames (13) near the middle of the base (10, 10A, 10B), are parallel with the first rotating shaft (30, 30A, 30B) and has two ends, a middle, two pulling segments (41) and a connecting beam (42). The pulling segments (41) are mounted on the second rotating shaft (40) near the ends and align with the pulling segments (31) of the first rotating shaft (30, 30A, 30B), and each pulling segment (41) has two pulling tabs (411). The pulling tabs (411) are mounted on the second rotating shaft (40), are parallel with each other and are protruded to the rear end of the base (10, 10A, 10B), and each pulling tab (411) has a contacting side. The connecting beam (42) is mounted on the middle of the second rotating shaft (40) between the pulling segments (41) and has a connecting end aligned with the connecting end of the connecting beam (32) of the first rotating shaft (30, 30A, 30B).

The linking beam (50) is mounted in the chamber of the base (10, 10A, 10B) between the rotating shafts (30, 30A, 30B, 40) and has two linking ends. The linking ends of the linking beam (50) are respectively connected pivotally to the connecting ends of the connecting beams (32, 42) of the rotating shafts (30, 30A, 30B, 40).

The wheel axles (60) are mounted in the chamber of the base (10, 10A, 10B) respectively near the side edges, are perpendicular to the rotating shafts (30, 30A, 30B, 40) and are located below the pulling tabs (311, 411) of the pulling segments (31, 41) of the rotating shafts (30, 30A, 30B, 40). Each wheel axle (60) has two ends, two engaging blocks (61), at least two wheels (62), a holding panel (64) and a torsional spring (63).

The ends of the wheel axle (60) are respectively connected to the mounting frames (13) near the ends of the base (10, 10A, 10B). The engaging blocks (61) may be T-shaped, are mounted on the wheel axle (60) below the pulling segments (31, 41) of the rotating shafts (30, 30A, 30B, 40). The wheels (62) are mounted on the wheel axle (60) between the ends and the engaging blocks (61) of the wheel axle (60). The holding panel (64) is mounted on the wheel axle (60) near the first rotating shaft (30, 30A, 30B). The torsional spring (63) is mounted around the wheel axle (60) near the holding panel (64) and has two ends. One of the ends of the torsional spring (63) is connected to the holding panel (64) and the other end is connected to the bottom of the base (10, 10A, 10B).

The drive pedal (70) is movably connected to the base (10, 10A, 10B) in the elongated through hole and has two opposite sides, an inner side, a bottom, two returning springs (71) and two loops (72). The opposite sides of the drive pedal (70) face respectively to the guide frames (12) of the base (10, 10A, 10B). The inner side of the drive pedal (70) contacts with the rear end of the base (10, 10A, 10B). The returning springs (71) are connected to the opposite sides of the drive pedal (70) and are connected to the guide frames (12) of the base (10, 10A, 10B) to make the drive pedal (70) moving up relative to the base (10, 10A, 10B). The loops (72) may be U-shaped, are mounted on the bottom of the drive pedal (70), protrude out of the inner side of the drive pedal (70) below the positioning elements (33) of the first rotating shaft (30, 30A, 30B) and selectively engage the gaps of the positioning elements (33).

With reference to FIGS. 4, 5, 7 and 8, when the operating bar (20, 20A, 20B) is rotated upward and out of the groove (11, 11A, 11B) in the base (10, 10A, 10B), the first rotating shaft (30, 30A, 30B) will be rotated with the operating bar (20, 20A, 20B). When the first rotating shaft (30, 30A, 30B) is rotated by the operating bar (20, 20A, 20B), the pilling segments (31), the connecting beam (32) and the positioning elements (33) on the first rotating shaft (30, 30A, 30B) will rotate downward relative to the wheel axles (60). When the connecting beam (32) is rotated by the first rotating shaft (30), the linking beam (50) will move forward and push the connecting beam (42) of the second rotating shaft (40) to rotate. As the connecting beam (42) being rotated by the linking beam (50), the second rotating shaft (40) will rotate relative to the wheel axles (60).

Then, the connecting sides of the pulling tabs (311, 411) of the pulling segments (31, 41) on the rotating shafts (30, 30A, 30B, 40) will contact with and push against the engaging blocks (61) of the wheel axles (60) to make the wheel axles (60) rotating relative to the base (10, 10A, 10B). With the rotation of the wheel axles (60), the wheels (62) on the wheel axles (60) will be expanded out of the chamber of the base (10, 10A, 10B) to contact the ground. At the same time, the positioning elements (33) will push against the loops (72) of the drive pedal (70) to move the drive pedal (70) downward, and the returning springs (71) will provide a force to move the drive pedal (70) upward when the gaps of the positioning elements (33) face the loops (72) to engage the loops (72) with the gaps in the positioning elements (33). With the engagement between the positioning elements (33) with the loops (72), the first rotating shaft (30, 30A, 30B) can be prevented from rotating to the original position. Accordingly, the wheel seat can be expanded to an operation condition to allow a user to push or pull a storage container or a golf bag easily.

Figure 6:
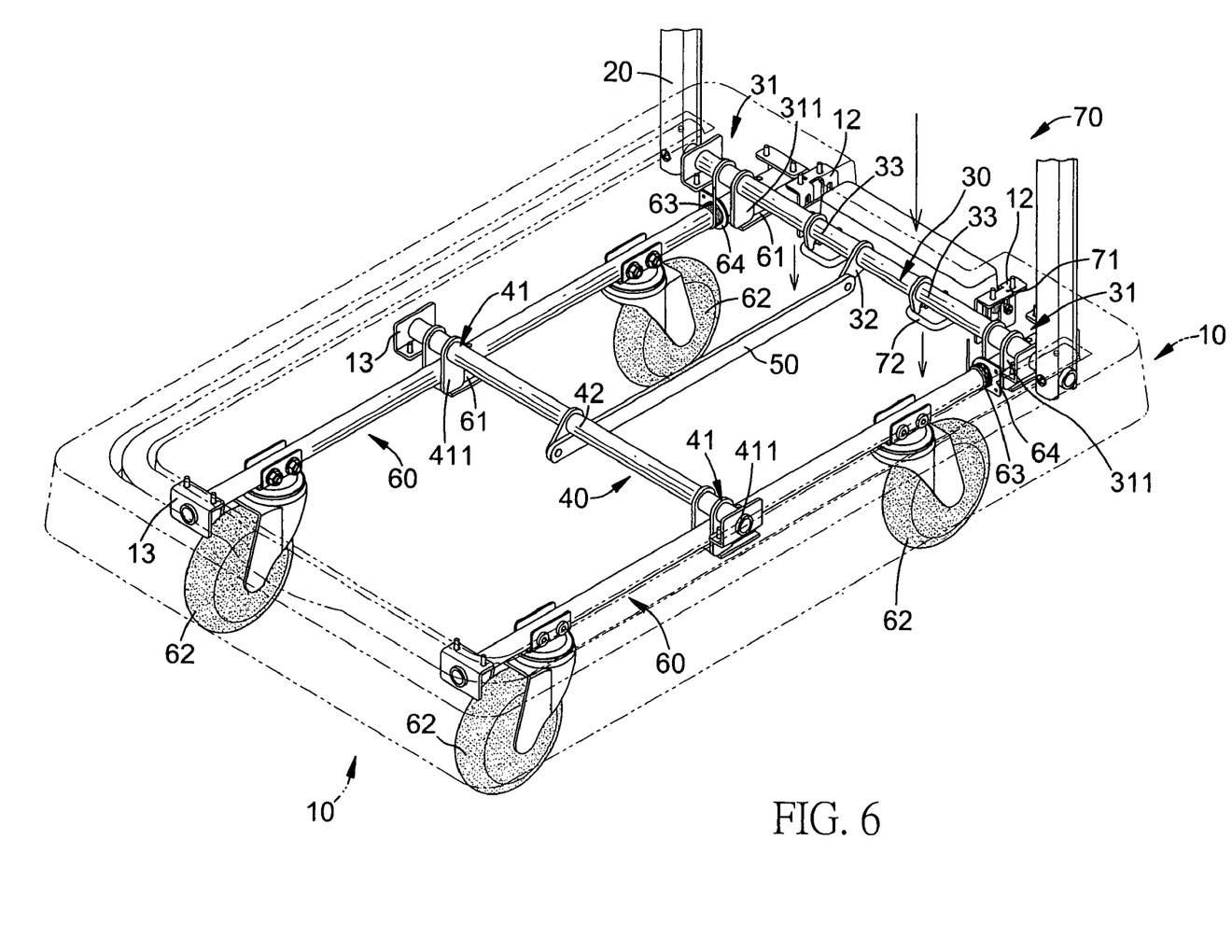
Figure 7:
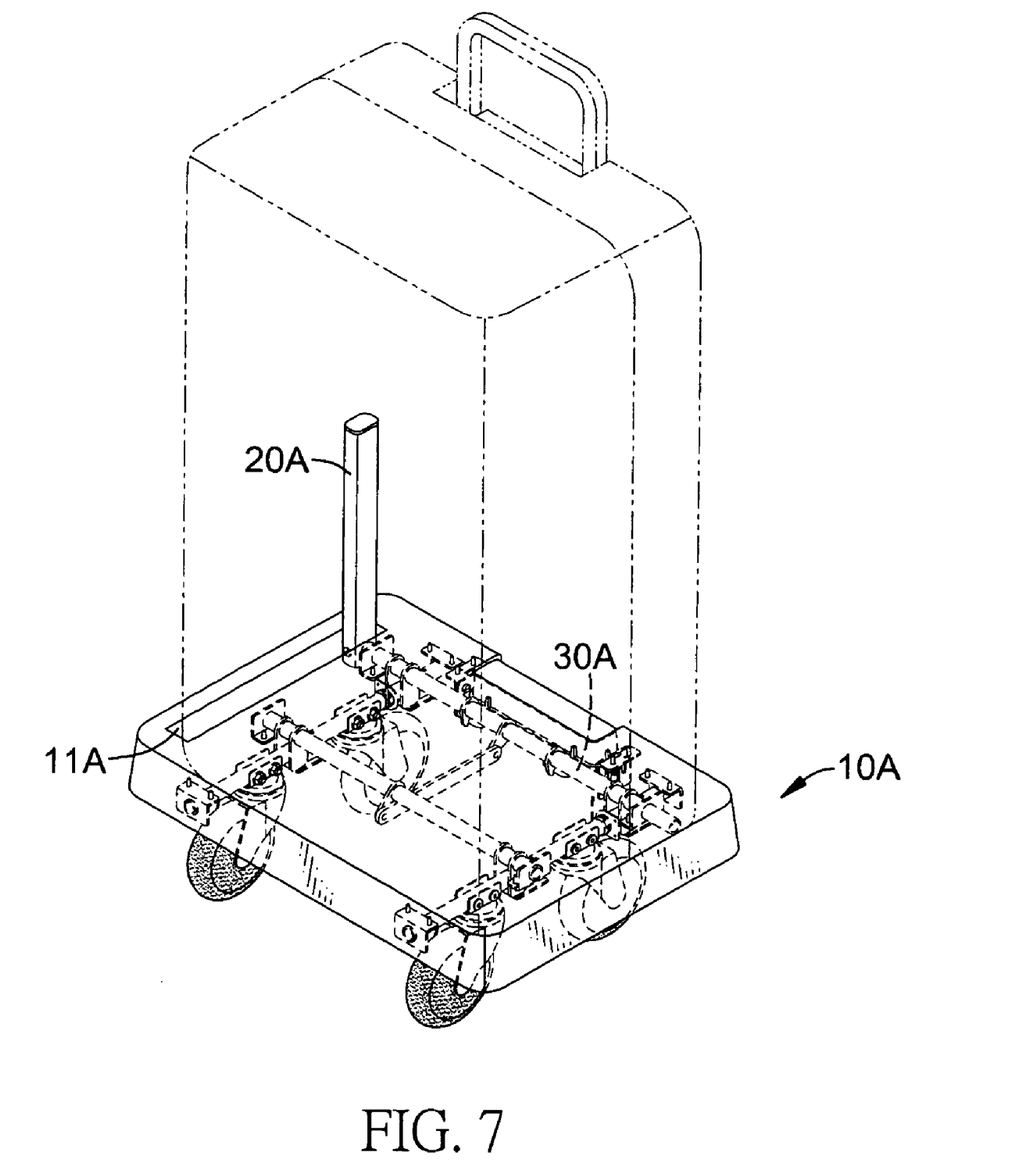
FIG. 7 is a perspective view of a second embodiment of a foldable wheel seat in accordance with the present invention mounted on a bottom of a storage container.
Figure 8:
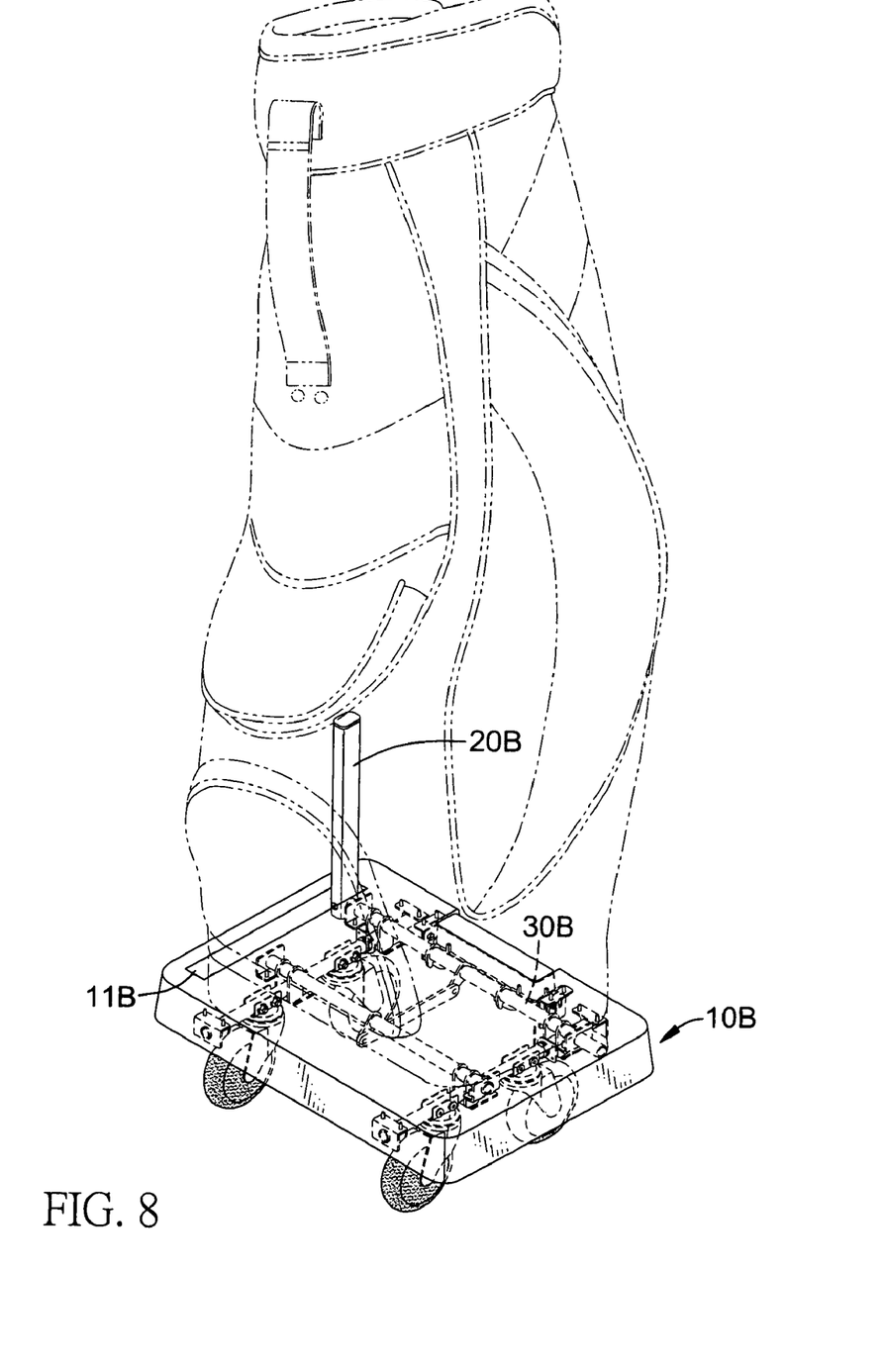
FIG. 8 is a perspective view of a third embodiment of a foldable wheel seat in accordance with the present invention mounted on a bottom of a golf bag.

With reference to FIG. 6, the user can fold the foldable wheel seat by pushing drive pedal (70) downward relative to the base (10, 10A, 10B) and rotating the operating bar (20, 20A, 20B) return into the groove (11, 11A, 11B). Then, the loops (72) on the bottom of the drive pedal (70) will separate from the positioning elements (33), and the pulling tabs (311, 411) of the pulling segments (31, 41) will separate from the engaging blocks (61) of the wheel axles (60). When the engaging blocks (61) separate from the pulling segments (31, 41) of the rotating shafts (30, 30A, 30B, 40), the torsional springs (63) will rotate the wheel axles (60) to the original position to make the wheels (62) held in the chamber of the base (10, 10A, 10B). Therefore, the foldable wheel seat as described can be folded conveniently to reduce the space for storing and transporting without turning the bottom of the foldable wheel seat over.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A foldable wheel seat having
   a base having
      a top face;
      a bottom face;
      a middle;
      a front end;
      a rear end;
      two side edges;
      a chamber being defined in the base between the faces of the base;
      an opening being formed through the bottom face of the base and communicating with the chamber; and
      a groove being formed in the top face of the base and having at least one end adjacent to the rear end of the base;
   an operating bar being mounted pivotally in the groove of the base;
   a first rotating shaft being mounted rotatably in the chamber of the base near the rear end and having
      two ends, wherein at least one of the ends of the first rotating shaft extends into the groove of the base near the rear end and is securely connected to the operating bar;

a middle; and two pulling segments being mounted on the first rotating shaft near the ends of the first rotating shaft, and each pulling segment having two pulling tabs being mounted on the first rotating shaft, being parallel with each other and protruding to the rear end of the base, and each pulling tab having a contacting side; and two wheel axles being mounted rotatably in the chamber of the base respectively near the side edges of the base and being perpendicular to the first rotating shaft and below the pulling tabs of the pulling segments of the first rotating shaft, and each wheel axle having two ends;

an engaging block being mounted on the wheel axle below and selectively pushed against by one of the pulling segments of the first rotating shaft;

at least two wheels being mounted on the wheel axle between the ends of the wheel axle;

a holding panel being mounted on the wheel axle near the first rotating shaft; and a torsional spring being mounted around the wheel axle near the holding panel and having two ends, one of the ends of the torsional spring being connected to the holding panel and the other end being connected to the bottom of the base.

2. The foldable wheel seat as claimed in claim 1, wherein the base further has an elongated through hole being formed through the rear end of the base near the middle of the base;

the first rotating shaft further has two positioning elements mounted on the first rotating shaft between the pulling segments, and each positioning element having a gap; and the foldable wheel seat further has a drive pedal movably connected to the base in the elongated through hole and having two opposite sides;

an inner side contacting with the rear end of the base;

a bottom; and two loops being U-shaped, being formed on the bottom of the drive pedal, protruding out of the inner side of the drive pedal and selectively engaging respectively the gaps of the positioning elements on the first rotating shaft.

3. The foldable wheel seat as claimed in claim 2, wherein the base further has two L-shaped guide frames mounted on the bottom of the base near the elongated through hole and respectively facing to the opposite sides of the drive pedal; and the drive pedal further has two returning springs being connected to the opposite sides of the drive pedal and connected to the guide frames of the base to make the drive pedal moving up relative to the base.

4. The foldable wheel seat as claimed in claim 3, wherein the first rotating shaft further has a connecting beam mounted on the middle of the first rotating shaft between the positioning elements and having a connecting end; and the foldable wheel seat further has a second rotating shaft being mounted rotatably in the chamber near the middle of the base, being parallel with the first rotating shaft and having two ends;

a middle;

two pulling segments being mounted on the second rotating shaft near the ends of the second rotating shaft and aligning respectively with the pulling segments of the first rotating shaft above the wheel axles, and each pulling segment having two pulling tabs being mounted on the second rotating shaft, being parallel with each other and protruding to the rear end of the base, and each pulling tab having a contacting side; and a connecting beam being mounted on the middle between the pulling segments of the second rotating shaft and having a connecting end aligned with the connecting end of the connecting beam of the first rotating shaft; and a linking beam being mounted in the chamber of the base between the rotating shafts and having two linking ends respectively connected pivotally to the connecting ends of the connecting beams of the rotating shafts.

5. The foldable wheel seat as claimed in claim 4, wherein each wheel axle further has a T-shaped engaging block being mounted on the wheel axle below one of the pulling segments of the second rotating shaft.

6. The foldable wheel seat as claimed in claim 5, wherein the base further has multiple L-shaped mounting frames mounted on the bottom of the base in pairs;

the first rotating shaft is mounted rotatably in the chamber of the base between two mounting frames near the rear end of the base;

the second rotating shaft is mounted rotatably in the chamber of the base between two mounting frames near the middle of the base; and the ends of each wheel axle are respectively connected to the mounting frames near the ends of the base.

7. The foldable wheel seat as claimed in claim 6, wherein the base is rectangular;

the groove is U-shaped and is formed along the front end and the side edges of the base;

the operating bar is U-shaped and is mounted in the groove; and the ends of the first rotating shaft extend into the groove of the base near the rear end and are securely connected to the U-shaped operating bar.

8. The foldable wheel seat as claimed in claim 6, wherein the base is rectangular;

the groove is elongated and is formed in the base near one of the side edges of the base the operating bar is elongated and is mounted in the groove; and one of the ends of the first rotating shaft extends into the groove of the base near the rear end and is securely connected to the operating bar.

9. The foldable wheel seat as claimed in claim 1, wherein the base is rectangular;

the groove is U-shaped and is formed along the front end and the side edges of the base;

the operating bar is U-shaped and is mounted in the groove; and the ends of the first rotating shaft extend into the groove of the base near the rear end and are securely connected to the U-shaped operating bar.

10. The foldable wheel seat as claimed in claim 1, wherein the base is rectangular;

the groove is elongated and is formed on the base near one of the side edges of the base the operating bar is elongated and is mounted in the groove; and one of the ends of the first rotating shaft extends into the groove of the base near the rear end and is securely connected to the operating bar.

* * * * *